Patented Jan. 6, 1942

2,268,999

UNITED STATES PATENT OFFICE 2,268,999

PROCESS FOR THE TREATMENT OF NITROSYL CHLORIDE - CHLORINE MIXTURES

Herman A. Beekhuis, Jr., Petersburg, Va., assignor to The Solvay Process Company, New York, N. Y., a corporation of New York No Drawing. Application July 5, 1938, Serial No. 217,634

13 Claims. (Cl. 23—157)

This invention relates to the treatment of mixtures of nitrosyl chloride and chlorine in metal apparatus.

It is known that by the reaction of aqueous nitric acid with metal chlorides such as sodium, potassium or calcium chloride the corresponding metal nitrates may be produced with the evolution of gaseous nitrosyl chloride and chlorine. The reaction mixture from which the nitrosyl chloride and chlorine are evolved contains water introduced in the aqueous nitric acid and that formed by reaction of the acid and metal chloride. Accordingly, the nitrosyl chloride-chlorine gases are substantially saturated with water vapor at the temperature at which they are evolved from the reaction mixture. These moist gases and the liquid obtained by condensing the nitrosyl chloride and chlorine from the moist gases, are highly corrosive to the metals ordinarily used in apparatus used for carrying out chemical processes. Ceramic ware or glass is resistant to corrosion by these gases and condensates therefrom, but the physical character of such materials and their capacities for transmitting heat make it undesirable to use such materials whenever it can be avoided.

It is an object of this invention to provide suitable conditions under which specific metals may be employed as materials of construction for apparatus in which the metal is contacted with mixtures of nitrosyl chloride and chlorine and to provide a process for the treatment of moist mixtures of nitrosyl chloride and chlorine which renders them relatively non-corrosive towards these metals.

I have discovered that by drying a moist mixture of nitrosyl chloride and chlorine until it contains not more than 0.1% (by weight) of water the thus dried mixture may be contacted with nickel or alloys of nickel with other materials which contain about 45% or more nickel, preferably while maintaining the mixture at temperatures not above about 400° C., and the rate of corrosion of these metals is sufficiently low that it is practicable to employ them as materials of construction for the apparatus in which the mixture of nitrosyl chloride and chlorine is treated. By maintaining the mixture at temperatures not above about 300° C. the metals are substantially unattacked by the nitrosyl chloride and chlorine.

This invention, accordingly, is directed to the treatment of mixtures of nitrosyl chloride and chlorine in metal apparatus wherein the surfaces exposed to contact with the mixture consist of nickel or a nickel alloy containing 45% or more nickel, and limiting the amount of water in the mixture of nitrosyl chloride and chlorine in contact with these metal surfaces to not greater than 0.1%. It is advisable to maintain the mixture in contact with the metal surfaces at temperatures not above about 400° C. and preferably not above about 300° C. Under these conditions the mixture of nitrosyl chloride and chlorine may be conveyed through pipes, stored in vessels, cooled to condense a liquid mixture of nitrosyl chloride and chlorine from gases containing the same, or such a liquid mixture may be heated to distil it; all of these, or any other desired treatment of a nitrosyl chloride-chlorine mixture being carried out with the mixture in contact with nickel or the nickel alloys set forth above without undue corrosion of the metal.

When the mixture of nitrosyl chloride and chlorine to be treated is moist initially, it is first dried until its moisture content is not greater than about 0.1% and the thus dried material is then introduced into the apparatus in which it is contacted with the metal. The drying of the nitrosyl chloride and chlorine mixture may take place in apparatus in which the surfaces exposed to contact with the moist mixture are of glass, ceramic ware or tantalum and may be accomplished by directly contacting the mixture with a drying agent such as phosphoric acid or with cold nitric acid. The moist nitrosyl chloride-chlorine gas may be passed through cooling coils of glass, of ceramic ware or of tantalum in which it is cooled to a temperature at which moisture condenses from the gas to an extent such that the residual moisture in the gas is not more than about 0.1% by weight.

I have also discovered that the very low rate of corrosion of nickel or nickel alloys by dry nitrosyl chloride-chlorine mixtures may be even further decreased by including in the mixture a proportion of nitrogen dioxide ($NO_2$ or $N_2O_4$). This invention comprises, therefore, the treatment of mixtures of nitrosyl chloride, chlorine and nitrogen dioxide in contact with metal surfaces consisting of nickel or of alloys containing 45% or more of nickel.

Among the metals suitable for practicing this invention, the following are given by way of illustration:

1. Metallic nickel in any of its forms, although rolled nickel is preferable to cast nickel due to its being more impervious to gases.
2. 58% nickel—20% molybdenum—the remainder principally iron.

3. 85% nickel—10% silicon—the remainder principally iron.
4. 58% nickel—14% chromium—17% molybdenum—the remainder principally iron.
5. 48% nickel—28% chromium—the remainder principally iron.
6. 70% nickel—30% copper.
7. 80% nickel—20% chromium.
8. 80% nickel—14% chromium—the remainder principally iron.

It should be understood this invention is not limited to the materials specifically mentioned. It is preferred, however, when an alloy of nickel is used it contain 45% or more nickel and the remainder principally a material from the group consisting of copper, silicon, chromium, molybdenum or iron, or a material from the group consisting of the elements having atomic numbers below 80 of group I, family B, group V, family A, group VI, family A, group VII, family A and group VIII of the periodic table and carbon and silicon. This group comprises in addition to the elements specifically named above, vanadium, manganese, cobalt, columbium, ruthenium, rhodium, palladium, silver, tantalum, tungsten, osmium, iridium, platinum and gold.

The invention is applicable to apparatus exposed to contact with mixtures of nitrosyl chloride and chlorine containing one mol or more NOCl to every 100 mols Cl₂, which are corrosive towards iron and steels commonly used for the apparatus in which gases and liquids are treated. In practicing this invention the mixtures of nitrosyl chloride and chlorine, with or without nitrogen dioxide, may be conveyed, stored or otherwise treated in contact with metal surfaces consisting of the nickel materials heretofore set forth. For example, these metals may be used for the construction of pumps used for compressing or pumping the gaseous or liquid mixtures. They may be used for the construction of heat exchangers, catalyst vessels, storage tanks, and the like, wherein the gaseous or liquid mixtures are in contact with surfaces consisting of these metals at temperatures below 400° C. The following are examples of the varied applications of this invention:

*Example I.*—A moist mixture of nitrosyl chloride and chlorine gases in about equal molecular proportions containing some nitric and hydrochloric acids such as is produced by boiling an aqueous reaction mixture of nitric acid and sodium chloride, is dried by passing it through a ceramic scrubber in which the mixture is washed with a countercurrent flow of about 60% nitric acid which has been cooled to a temperature of, for example, −10° C. to 0° C. before introducing it into contact with the gases. Water vapor is condensed and washed out of the gases by the cool acid, which also removes from the gases substantially all the nitric acid vapors and hydrochloric acid contained therein. The gases leaving the scrubber at about 0° C. contain less than 0.1% residual water vapor. The dried gases are forced by a blower through a cooling coil in which the nitrosyl chloride and chlorine gases are liquefied. The liquid mixture of nitrosyl chloride and chlorine is then fractionally distilled in a distillation column. The surfaces of the blower, cooling coil and distillation column which are contacted with the dried nitrosyl chloride-chlorine mixture consist of metallic nickel or an alloy containing 45% or more nickel. The rate of corrosion of these metal surfaces is extremely low, so that it is practicable to employ these metals as a material of construction for these elements of the apparatus.

In the process of this example, the preliminary drying of the moist gas containing nitrosyl chloride and chlorine may be accomplished by passing the gas through a glass or ceramic cooling coil in which the gas is cooled to a temperature at which its moisture content is reduced to less than 0.1% by condensation of moisture from the gas. The condensed moisture is separated from the dried gas, and the gas is then passed into the cooling coil in which the nitrosyl chloride and chlorine are liquefied. After fractionally distilling the mixture of liquefied gases to separately recover the chlorine and nitrosyl chloride, the nitrosyl chloride may be oxidized to form gaseous nitrogen dioxide and chlorine. The gas resulting from the oxidation of the nitrosyl chloride is then cooled to condense a liquid mixture of nitrogen dioxide and chlorine, which may contain also residual unoxidized nitrosyl chloride. The liquid containing chlorine and nitrogen dioxide is then fractionally distilled to separately recover the chlorine and nitrogen dioxide.

*Example II.*—A dry, gaseous mixture of nitrosyl chloride, chlorine and oxygen containing less than 0.1% moisture is passed through a heat exchanger in which the tubes and surfaces with which the gas mixture comes into contact are constructed of nickel or of nickel-clad steel. The gas mixture may contain about equal molecular proportions of nitrosyl chloride and chlorine or may contain but a relatively small proportion of chlorine to nitrosyl chloride. The gas mixture is heated to a temperature of about 200° C. during its passage through the heat exchanger and at this temperature is introduced into a chamber in which it is passed in contact with a catalyst promoting the reaction of the nitrosyl chloride and oxygen. The gases in the catalyst chamber are maintained at a temperature of about 300° C. The surfaces of the catalyst chamber exposed to contact with the nitrosyl chloride-chlorine gas and the gaseous product of the reaction (a gas containing residual unreacted nitrosyl chloride and oxygen together with chlorine and nitrogen dioxide) are constructed, similarly to the heat exchanger, of nickel or nickel-clad steel. Nickel piping is employed for conveying the gases from the preheater to the catalyst chamber and from the catalyst chamber to subsequent treatments.

In this specification and in the appended claims, when reference is made to the moisture content of a mixture of nitrosyl chloride and chlorine, it is intended to refer to the total moisture, both free and combined as HNO₃ and HCl, of the mixture. One mol of HCl or HNO₃ is equivalent to one-half mol of free water.

This application is a continuation-in-part of my copending application Serial No. 696,138, filed November 1, 1933.

I claim:

1. In the treatment of a mixture of nitrosyl chloride and chlorine in metal apparatus, the improvement which comprises constructing the surfaces of said apparatus with which said mixture is contacted of a metal from the group consisting of nickel and alloys of nickel containing 45% or more nickel and, while said mixture is in contact with said metal, excluding from the mixture moisture in amount in excess of 0.1% by weight.

2. In a process for the treatment of a moist mixture of nitrosyl chloride and chlorine, the improvement which comprises drying said mixture to reduce its moisture content to not more than 0.1% by weight and thereafter treating the dried mixture at temperatures not above about 400° C. in metal apparatus in which the surfaces exposed to contact with the mixture consist of a metal from the group consisting of nickel and alloys thereof containing 45% or more nickel.

3. In the treatment of a mixture of nitrosyl chloride and chlorine in metal apparatus, the improvement which comprises constructing the surfaces of said apparatus with which said mixture is contacted of a metal from the group consisting of nickel and alloys of nickel containing 45% or more nickel and the remainder principally material from the group consisting of the elements having atomic numbers below 80 of group I, family B, group V, family A, group VI, family A, group VII, family A, and group VIII of the periodic table, carbon and silicon and, while said mixture is in contact with said metal, excluding from the mixture moisture in amount in excess of 0.1% by weight.

4. In a process for the treatment of a moist mixture of nitrosyl chloride and chlorine, the improvement which comprises drying said mixture to reduce its moisture content to not more than 0.1% by weight and thereafter treating the dried mixture at temperatures not above about 400° C. in metal apparatus in which the surfaces exposed to contact with the mixture consist of a metal from the group consisting of nickel and alloys thereof containing 45% or more nickel and the remainder principally material from the group consisting of the elements having atomic numbers below 80 of group I, family B, group V, family A, group VI, family A, group VII, family A, and group VIII of the periodic table, carbon and silicon.

5. In the treatment of a mixture of nitrosyl chloride, chlorine and nitrogen dioxide in metal apparatus, the improvement which comprises constructing the surfaces of said apparatus with which said mixture is contacted of a metal from the group consisting of nickel and alloys of nickel containing 45% or more nickel and the remainder principally material from the group consisting of the elements having atomic numbers below 80 of group I, family B, group V, family A, group VI, family A, group VII, family A, and group VIII of the periodic table, carbon and silicon and, while said mixture is in contact with said metal, excluding from the mixture moisture in amount in excess of 0.1% by weight.

6. In a process for the treatment of a moist mixture of nitrosyl chloride, chlorine and nitrogen dioxide, the improvement which comprises drying said mixture to reduce its moisture content to not more than 0.1% by weight and thereafter treating the dried mixture in metal apparatus in which the surfaces exposed to contact with the mixture consist of a metal from the group consisting of nickel and alloys thereof containing 45% or more nickel and the remainder principally material from the group consisting of the elements having atomic numbers below 80 of group I, family B, group V, family A, group VI, family A, group VII, family A, and group VIII of the periodic table, carbon and silicon, and maintaining said mixture while in contact with said metal surfaces at temperatures not above about 400° C.

7. In the treatment of a mixture of nitrosyl chloride and chlorine, in metal apparatus, the improvement which comprises constructing the surfaces of said apparatus with which said mixture is contacted of a metal from the group consisting of nickel and alloys of nickel containing 45% or more nickel and the remainder principally material from the group consisting of the elements having atomic numbers below 80 of group I, family B, group V, family A, group VI, family A, group VII, family A, and group VIII of the periodic table, carbon and silicon, maintaining in said mixture while it is in contact with said metal sufficient nitrogen dioxide to reduce the rate of corrosion of the metal by said mixture and while said mixture is in contact with said metal, excluding from the mixture moisture in amount in excess of 0.1% by weight and maintaining the mixture at temperatures not above about 400° C.

8. The process for the treatment of a moist gas containing nitrosyl chloride and chlorine to recover the chlorine separate from the nitrosyl chloride in said gas, which comprises drying the moist gas until its residual moisture content is no more than 0.1% in an apparatus in which the surfaces exposed to contact with said gas are of a material from the group consisting of glass and ceramic ware and separating said gas from the moisture removed therefrom in thus drying it, thereafter cooling the dried gas to condense therefrom a liquid mixture of nitrosyl chloride and chlorine in contact with metal surfaces composed of a material from the group consisting of nickel and its alloys which contain 45% or more nickel and the remainder principally material from the group consisting of the elements having atomic numbers below 80 of group I, family B, group V, family A, group VI, family A, group VII, family A, and group VIII of the periodic table, carbon and silicon, and then separately recovering chlorine and nitrosyl chloride from the liquid mixture.

9. The process for the treatment of a moist gas containing nitrosyl chloride and chlorine to recover the chlorine separate from the nitrosyl chloride in said gas, which comprises passing the moist gas in an apparatus in which the surfaces exposed to contact with the moist gas are of a material from the group consisting of glass, ceramic ware and tantalum in contact with a drying agent which does not react with nitrosyl chloride and chlorine and thereby decreasing the moisture content of the gas to not more than 0.1%, thereafter cooling the dried gas to condense therefrom a liquid mixture of nitrosyl chloride and chlorine in contact with metal surfaces composed of a material from the group consisting of nickel and its alloys which contain 45% or more nickel and the remainder principally material from the group consisting of the elements having atomic numbers below 80 of group I, family B, group V, family A, group VI, family A, group VII, family A and group VIII of the periodic table, carbon and silicon, and separately recovering chlorine and nitrosyl chloride from the liquid mixture.

10. The process for the treatment of the hot moist gas formed by heating an aqueous reaction mixture of nitric acid and a metal chloride to evolve nitrosyl chloride and chlorine, which comprises passing said gas in countercurrent flow and in direct contact with cold nitric acid at a temperature at which the acid reduces the moisture content of the gas to not more than 0.1%, and then cooling the thus dried nitrosyl chloride-chlorine gas to condense therefrom a liquid mixture of nitrosyl chloride and chlorine and fractionally distilling the liquid in apparatus wherein the surfaces which are contacted with the dried nitrosyl chloride and chlorine are composed of a metal from the group consisting of nickel and alloys thereof containing 45% or more nickel and the remainder principally material from the group consisting of the elements having atomic numbers below 80 of group I, family B, group V, family A, group VI, family A, group VII, family A and group VIII of the periodic table, carbon and silicon.

11. The process for the treatment of a moist gas containing nitrosyl chloride and chlorine to recover the chlorine separate from the nitrosyl chloride in said gas, which comprises drying the moist gas in an apparatus in which the surfaces exposed to contact with said gas are of a material from the group consisting of glass, ceramic ware and tantalum and separating said gas from the moisture contained therein, thereafter cooling the dried gas to condense therefrom a liquid mixture of nitrosyl chloride and chlorine in contact with metal surfaces composed of a material from the group consisting of nickel and its alloys which contain 45% or more nickel and the remainder principally material from the group consisting of the elements having atomic numbers below 80 of group I, family B, group V, family A, group VI, family A, group VII, family A and group VIII of the periodic table, carbon and silicon, and then separately recovering chlorine and nitrosyl chloride from the liquid mixture, oxidizing the nitrosyl chloride to form gaseous nitrogen peroxide and chlorine, cooling the gases from the oxidation of the nitrosyl chloride to condense therefrom a liquid mixture of nitrogen peroxide and chlorine, and separately recovering chlorine and nitrogen peroxide from the liquid mixture.

12. The process for the treatment of a moist gas containing nitrosyl chloride and chlorine to recover the chlorine separate from the nitrosyl chloride in said gas, which comprises passing the moist gas into an apparatus in which the surfaces exposed to contact with the moist gas are of a material from the group consisting of glass, ceramic ware and tantalum in contact with a drying agent which does not react with nitrosyl chloride and chlorine, thereafter cooling the dried gas to condense therefrom a liquid mixture of nitrosyl chloride and chlorine in contact with metal surfaces composed of a material from the group consisting of nickel and its alloys which contain 45% or more nickel and the remainder principally material from the group consisting of the elements having atomic numbers below 80 of group I, family B, group V, family A, group VI, family A, group VII, family A and group VIII of the periodic table, carbon and silicon, separately recovering chlorine and nitrosyl chloride from the liquid mixture, oxidizing the nitrosyl chloride to form gaseous nitrogen peroxide and chlorine, cooling the gases from the oxidation of the nitrosyl chloride to condense therefrom a liquid mixture of nitrogen peroxide and chlorine, and separately recovering chlorine and nitrogen peroxide from the liquid mixture.

13. In the treatment of nitrosyl chloride in metal apparatus, the improvement which comprises constructing the surfaces of said apparatus with which nitrosyl chloride is contacted of a metal from the group consisting of nickel and alloys of nickel containing 45% or more nickel and, while said nitrosyl chloride is in contact with said metal, excluding therefrom moisture in amount in excess of 0.1% by weight.

HERMAN A. BEEKHUIS, Jr.